United States Patent
Kohtani et al.

[11] Patent Number: 5,872,636
[45] Date of Patent: Feb. 16, 1999

[54] FLEXIBLE RESOLUTION CONTROL AND MATCHING IN IMAGE PROCESSING

[75] Inventors: Hideto Kohtani; Masanori Sakai; Takehito Utsunomiya, all of Yokohama; Hideyuki Makitani, Fuchu, all of Japan

[73] Assignee: Canon Kabushiki Kaisha, Tokyo, Japan

[21] Appl. No.: 967,388

[22] Filed: Oct. 28, 1992

[30] Foreign Application Priority Data

Nov. 1, 1991 [JP] Japan ................................. 3-287750
Dec. 26, 1991 [JP] Japan ................................. 3-344285

[51] Int. Cl.⁶ .............................. H04N 1/40; G06K 9/36; G06F 15/00
[52] U.S. Cl. ........................ 358/298; 358/448; 358/458; 395/109; 382/222
[58] Field of Search .................... 358/298, 296, 358/443, 444, 448, 455, 456, 530, 458; 395/128, 112, 101, 109; 382/276, 299

[56] References Cited

U.S. PATENT DOCUMENTS

| | | | |
|---|---|---|---|
| 4,827,352 | 5/1989 | Yoneda et al. | 358/298 X |
| 4,841,375 | 6/1989 | Nakajima et al. | 353/280 |
| 4,905,097 | 2/1990 | Watanabe et al. | 358/456 |
| 4,926,268 | 5/1990 | Kawamura et al. | 358/298 X |
| 5,010,497 | 4/1991 | Shimada | 358/455 X |
| 5,038,298 | 8/1991 | Matsumoto et al. | 364/518 |
| 5,166,786 | 11/1992 | Sakai et al. | 358/76 |
| 5,268,771 | 12/1993 | Murakami et al. | 358/448 |
| 5,283,662 | 2/1994 | Nakajima | 358/409 |
| 5,294,996 | 3/1994 | Sobue | 358/298 |
| 5,327,258 | 7/1994 | Ueda | 358/448 |
| 5,521,990 | 5/1996 | Ishizawa et al. | 382/270 |

FOREIGN PATENT DOCUMENTS

88 06769   9/1988   WIPO ..................... G06F 15/68

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An image processing apparatus includes a resolution ratio setting unit for setting a ratio of the resolution of input image data to the resolution of multi-value image data to be output, a pixel interpolation unit for interpolating and determining pixel values of output multi-value image data on the basis of the ratio set by the resolution ratio setting unit and the input image data, and an image data output unit for outputting the multi-value image data generated by the pixel interpolation unit.

42 Claims, 10 Drawing Sheets

FLEXIBLE RESOLUTION CONTROL AND MATCHING IN IMAGE PROCESSING

BACKGROUND OF THE INVENTION

1. Field of the Invention

The present invention relates to an image processing apparatus suitably applied to a page printer, a digital copying machine, and the like.

2. Related Background Art

Conventionally, most page printers do not have a function of generating a large image. In addition, a storage means for image generation has a capacity corresponding to only one page of the maximum outputtable image size. Even when the image size can be changed, since the maximum outputtable image size is relatively small, such a page printer is used for outputting an image in the maximum image size or in a size close to it.

However, when the page printer has only a storage capacity corresponding to one page of an image, image development processing for the next page cannot be started until an image output operation for the current page is completed. For this reason, in a compound machine comprising a copying machine and a page printer having a high print speed, the high print speed cannot often be sufficiently utilized. Most of such compound machines have a relatively large maximum outputtable image size. Meanwhile, image sizes that a user frequently outputs are often half or less of the maximum image size. In this case, the use efficiency of a memory is low.

A conventional image forming apparatus such as a page printer having a recording unit executes recording using a density obtained by expressing the density of one pixel as a binary value. For this reason, when the resolution of image data to be recorded is different from that of the recording unit, the resolution of the recording unit must be changed by the image forming apparatus side to match with that of the image data, or resolution conversion processing of binary data must be performed.

As for image data whose resolution can be changed, e.g., image data such as vector data, binary image data to be developed is determined by the resolution of the recording unit. In the image forming apparatus, image data is developed to binary image data in correspondence with the resolution of the recording unit, and the developed data is output from the recording unit.

However, as a countermeasure to be taken when the resolution of the input image data is different from that of the recording unit of the image forming apparatus, to prepare a plurality of resolutions in the recording unit of the image recording apparatus results in a complicated apparatus arrangement and high cost, and only the prepared resolutions can be used. When resolution conversion of binary image data is performed in the image forming apparatus, image quality is considerably deteriorated.

Furthermore, when vector data or the like is developed to binary image data, if the resolution of the recording unit is high, it takes much time in the image forming apparatus to develop image data.

SUMMARY OF THE INVENTION

It is an object of the present invention to solve the above-mentioned problems.

According to the present invention, in an image forming apparatus capable of outputting an image in a relatively large size, a large capacity of a storage means for image generation is assured, and the storage means is divided into a generation area and an output area depending on the size of an image to be generated, thus improving the throughput and the use efficiency of the memory.

It is another object of the present invention to provide an image forming apparatus, which can execute flexible resolution conversion corresponding to various resolutions with less deterioration of image quality without complicating an arrangement in such a manner that input image data is converted into multi-value image data with a desired resolution, and the converted image data is output.

It is still another object of the present invention to provide an image forming apparatus, which can develop image data, whose resolution can be changed, at a desired resolution, and thereafter, can convert the resolution of the developed image data to a resolution matching with an output apparatus, so that the image data is developed at a resolution lower than that of the output apparatus so as to shorten the development time of the image data.

According to an aspect of the present invention, an image forming apparatus comprises resolution ratio setting means for setting a ratio of a resolution of input multi-value image data to a resolution of multi-value image data to be output, pixel interpolation means for interpolating and determining pixel values of output multi-value image data on the basis of the ratio set by the resolution ratio setting means and the input multi-value image data, and image data output means for outputting the output multi-value image data generated by the pixel interpolation means.

According to another aspect of the present invention, an image forming apparatus comprises binary and multi-value conversion means for converting input binary image data into multi-value image data, resolution ratio setting means for setting a ratio of a resolution of the input binary image data to a resolution of multi-value image data to be output, pixel interpolation means for determining pixel values of output multi-value image data on the basis of the ratio set by the resolution ratio setting means and the multi-value image data generated by the binary and multi-value conversion means, and image data output means for outputting the output multi-value image data generated by the pixel interpolation means.

Furthermore, according to still another aspect of the present invention, the above-mentioned image forming apparatus further comprises data development means for, when the input image data is image data in a format capable of changing a resolution, developing the input image data onto an image memory as binary image data with a designated resolution.

With the above arrangement, input multi-value or binary image data is converted into multi-value image data according to a ratio of the resolution of the input image data to that of the output image data. Thus, the multi-value image data having a desired resolution can be obtained regardless of the resolution of the input image data.

Furthermore, as for image data whose resolution can be changed, input image data is developed to binary image data having a desired resolution, and the developed image data is further converted into multi-value image data having a desired resolution.

Other objects, effects, and advantages of the resent invention will become apparent from the detailed description taken in conjunction with the accompanying drawings, and the appended claims.

DETAILED DESCRIPTION OF THE PREFERRED EMBODIMENTS

The preferred embodiments of the present invention will be described in detail hereinafter with reference to the accompanying drawings.

<First Embodiment>

Figure 1:
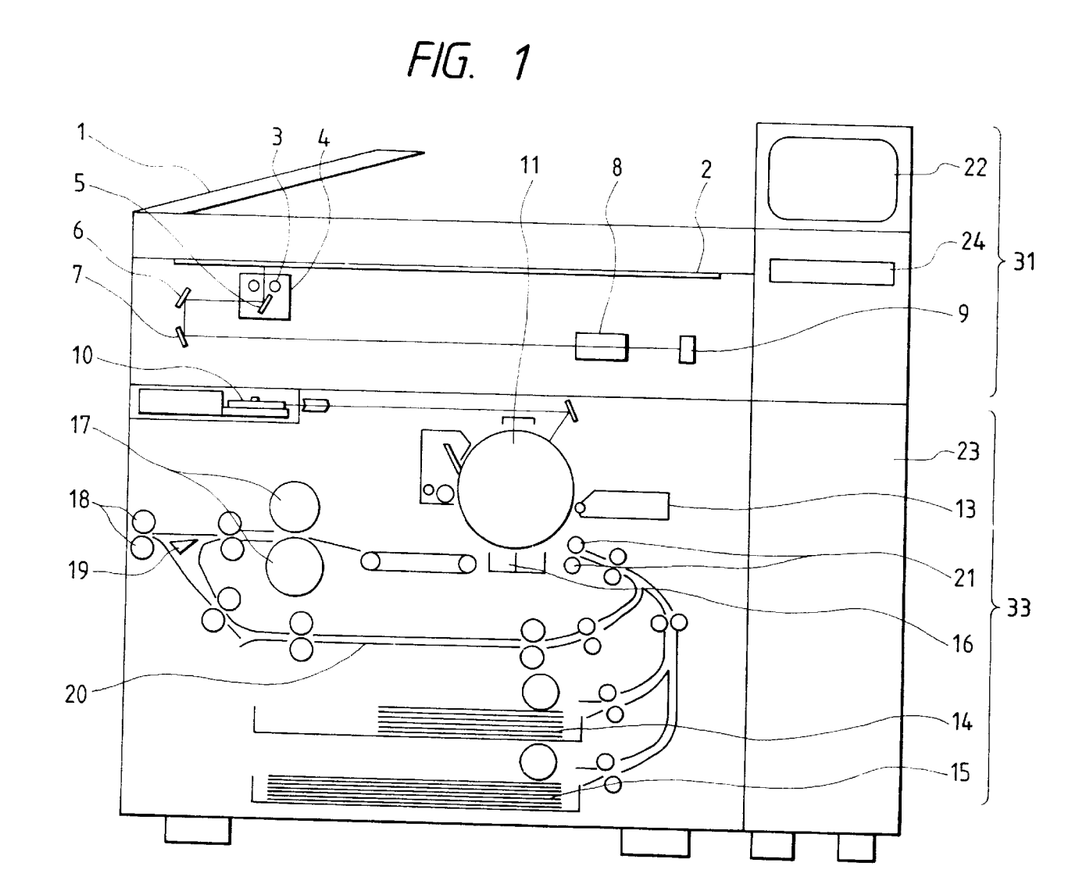
FIG. 1 is a schematic view showing the entire image forming apparatus according to the first and second embodiments of the present invention.

In an image forming apparatus of the first embodiment, a digital copying machine embodied as a multi-value printer will be described. FIG. 1 is a schematic view of the entire digital copying machine used in the image forming apparatus of the first embodiment. In general, the digital copying machine comprises a printer unit 33 capable of printing density data as multi-value data in units of pixels so as to output an image read by an image reader 31 with high quality.

In FIG. 1, originals placed on an original feeder 1 are sequentially conveyed onto an original table glass surface 2 one by one. When an original is conveyed, a lamp 3 of a scanner unit 4 is turned on, and the scanner unit 4 moves to illuminate the original. Light reflected by the original is transmitted through a lens 8 via mirrors 5, 6, and 7, and is input to an image sensor unit 9. The arrangement and function of the image reader 31 have been described.

Figure 2:
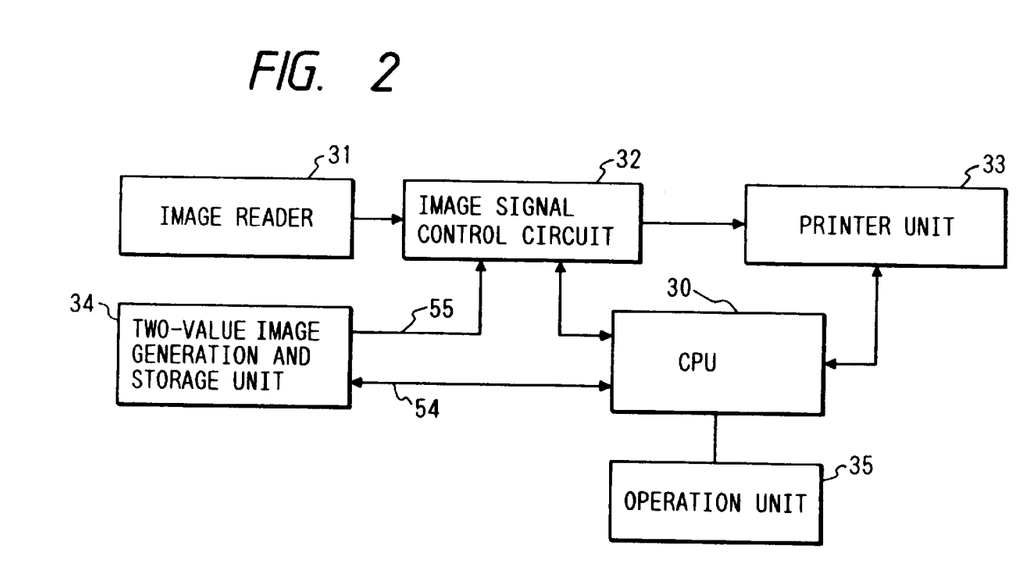
FIG. 2 is a block diagram of the image forming apparatus.

FIG. 2 is a block diagram of the image forming apparatus according to this embodiment. An output signal from the image reader 31, i.e., an image signal output from the image sensor unit 9, is input to an image signal control circuit 32 controlled by a CPU 30. The image signal control circuit 32 converts input image data into digital multi-value image data, further processes the converted data, and supplies the processed data to the printer unit 33.

A laser beam is controlled by an exposure control unit 10 according to a signal input from the image signal control circuit 32 to the printer unit 33, and is radiated on a photosensitive body 11 as a light signal. A latent image formed on the photosensitive body 11 by the radiated light is developed by a developing unit 13. A transfer sheet is conveyed from a transfer sheet stack unit 14 or 15 in synchronism with the formation of the latent image, and is registered by registration rollers 21. Thereafter, the developed image is transferred onto the transfer sheet. The transferred image is fixed to the transfer sheet by a fixing unit 17, and the transfer sheet is discharged outside the apparatus by a sheet discharge unit 18. Note that an intermediate tray 20 is used in a dual-surface print mode, and a flapper 19 is used for switching the sheet convey path to the sheet discharge unit or the intermediate tray 20.

An arrangement with which the printer unit 33 of the image forming apparatus of this embodiment outputs multi-value density data will be described below. The printer unit 33 of this embodiment employs a laser beam as exposure means for scanning in units of lines, and a signal for controlling the laser beam is modulated to change the radiation area on the photosensitive body 11, so that area gradation can be realized in units of pixels, and an image can be expressed as multi-value data.

Figure 3:
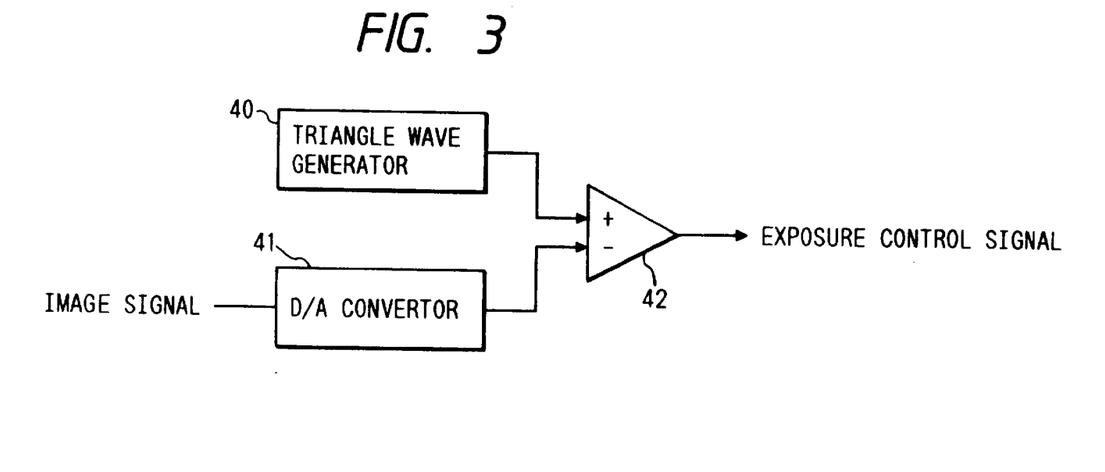
FIG. 3 is a circuit diagram of an exposure control signal generation circuit.

FIG. 3 is a circuit diagram of a circuit for generating a signal for modulating the laser beam on the basis of an image signal input to the printer unit 33. Density data of an image based on an image signal input to the printer unit 33 is a digital value. When this value is input to a D/A converter 41 in units of pixels, the digital value is converted into an analog value, and the analog value is input to a comparator 42. A triangle wave generator 40 supplies a triangle wave to be compared with an image signal to the comparator 42.

Figure 4:
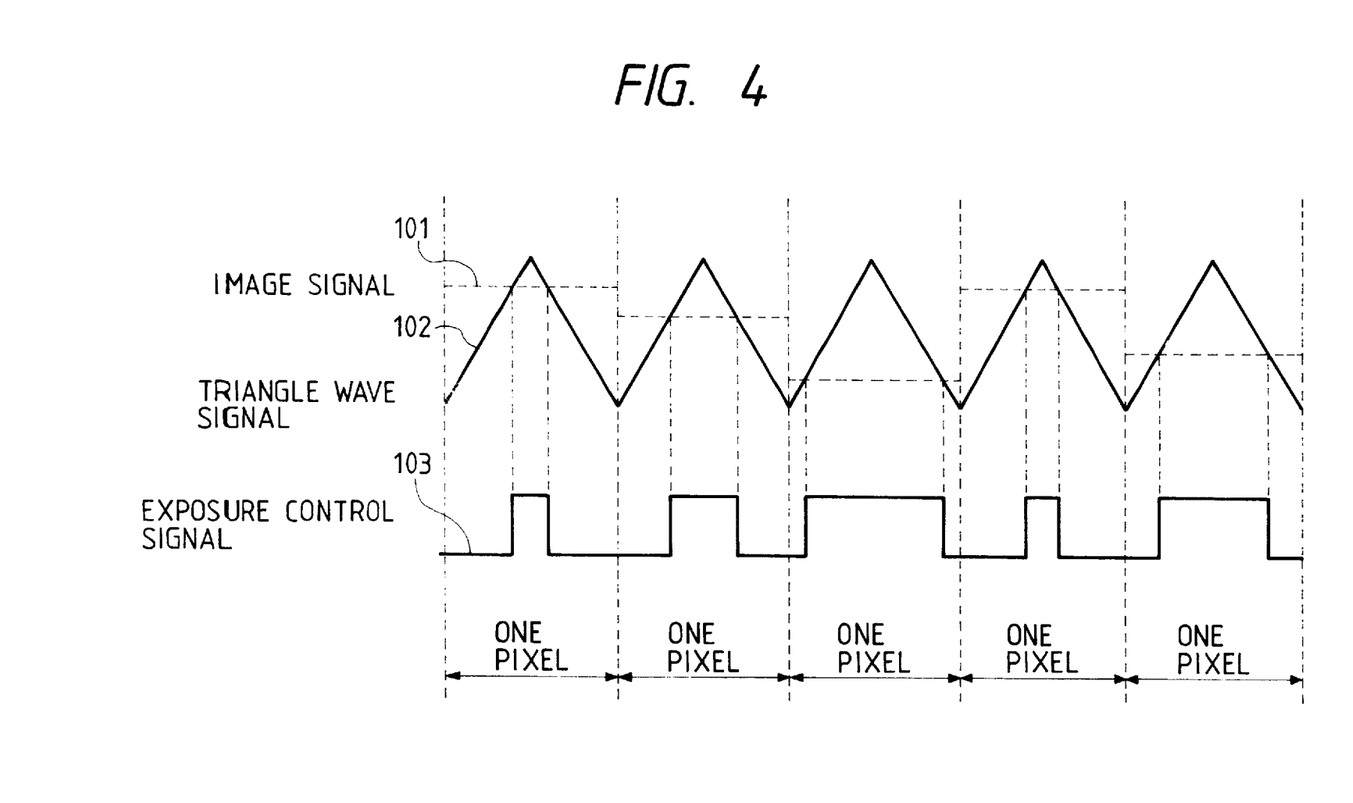
FIG. 4 is a timing chart showing signal waveforms upon generation of an exposure control signal.

FIG. 4 is a timing chart showing the relationship among an image signal 101 and a triangle wave output 102, which are input to the comparator 42, and an exposure control signal 103 output from the comparator 42. The exposure control signal 103 is output as a pulse-width modulation (PWM) signal corresponding to the level of the image signal 101. When the radiation time of the laser beam for each pixel in one scanning line is controlled according to the exposure control signal 103, the radiation area of each pixel can be changed, and area gradation can be realized.

Figure 5:
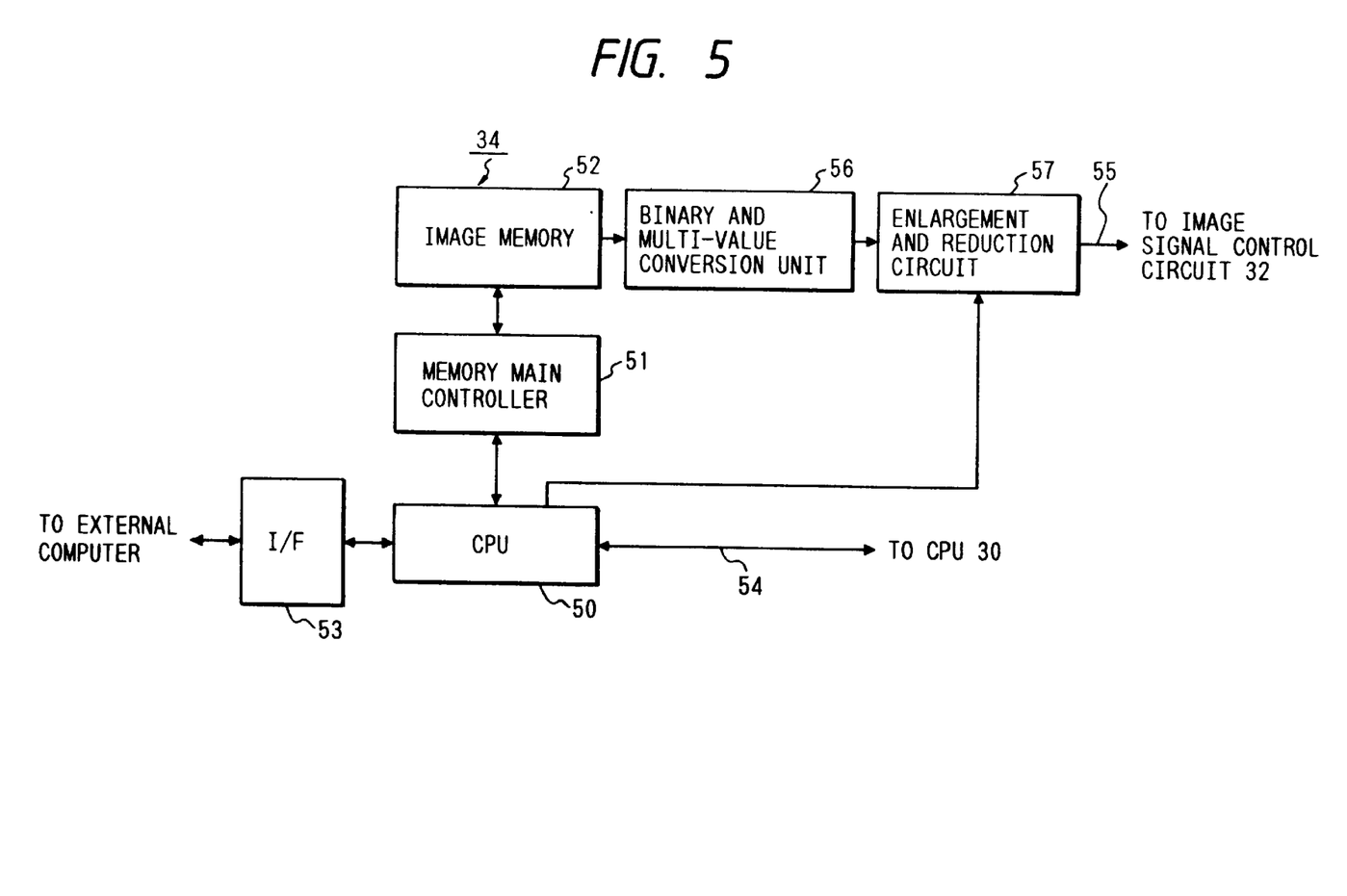
FIG. 5 is a block diagram of a two-value (binary) image generation and storage unit.

A two-value (binary) image generation and storage unit 34 shown in FIG. 2 will now be described. FIG. 5 is a block diagram showing the details of the binary image generation and storage unit 34. The binary image generation and storage unit 34 develops image data on the basis of data according to a page descriptive language sent from an external computer. The page descriptive language means a language system for expressing image data in units of pixels to be output by, e.g., a page printer in the form of commands.

An interface 53 is an I/O interface with the external computer. Upon reception of the page descriptive language data input through the I/O interface 53, a CPU 50 interprets the content of the input data, and develops binary image data for one page onto an image memory 52 through a memory main controller 51. The image developed in this manner or an image read by the image reader 31 may be stored in a disk device 24 or may be displayed on a display device 22. In general, the image is output by the printer unit 33. Upon completion of the development of image data, the CPU 50 communicates with the CPU 30 through communication line 54 to prepare for communication of image data through an image data bus 55. When image data is transmitted to the image signal control circuit 32, the image data is converted through a binary and multi-value conversion unit 56 and an enlargement and reduction circuit 57 shown in FIG. 5. The binary and multi-value conversion unit 56 assigns two values of image data developed on the image memory 52 to the maximum and minimum values of multi-value data, and outputs the multi-value data. The enlargement and reduction circuit 57 executes resolution conversion of the input multi-value data in the main scanning and subscanning directions according to the following algorithm.

Figure 6:
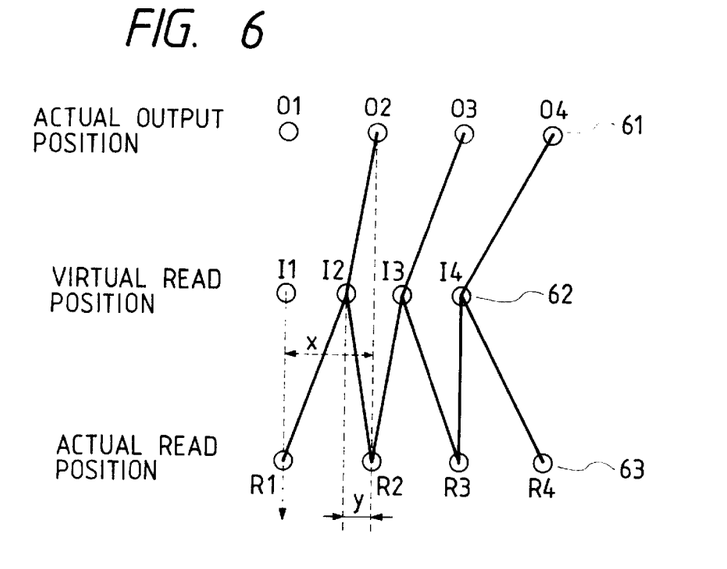
FIG. 6 is an explanatory view of an enlargement and reduction algorithm.

A multi-value image enlargement & reduction method will be described with reference to FIG. 6. In this case, main scanning pixels are enlarged to x/(x−y)%. At an equal (one-to-one) magnification, no problem is posed since actual output positions 61 and actual read positions 63 of original image data (FIG. 6) correspond to each other. In an enlargement mode, it is considered that image signals are input at virtual read positions 62. When image data at the virtual read positions 62 are output to the actual output positions 61, an image data can be enlarged. An image data density at each virtual read position 62 is interpolated from density values of image signals input at the actual read positions 63 according to the following equation:

$$O2 = [R1 \cdot y + R2 \cdot (x-y)]/x$$

In the subscanning direction, this algorithm can be applied to scanning lines.

Figure 7:
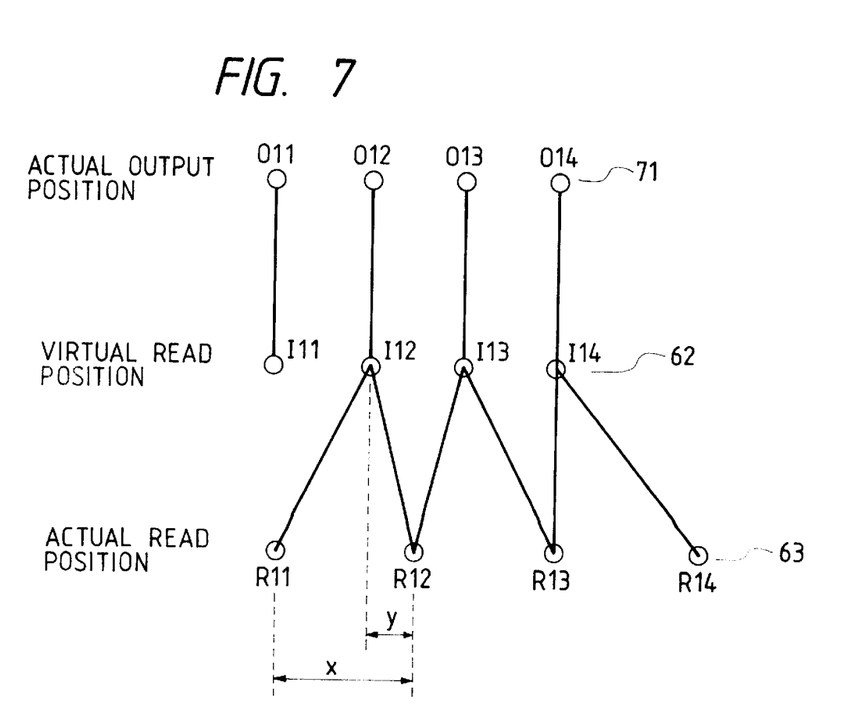
FIG. 7 is an explanatory view of a resolution conversion algorithm.

FIG. 7 shows a state wherein the above-mentioned enlargement and reduction circuit executes resolution conversion. When the virtual read positions 62 in FIG. 6 are considered as actual output positions 71, resolution conversion is executed. As shown in FIG. 7, when pixels at virtual read positions are interpolated so as to perform image enlargement, the resolution can be converted to a higher one. On the other hand, when pixels at virtual read positions are interpolated so as to perform reduction, the resolution can be converted to a lower one.

Based on the above description, the operation of the copying machine of the first embodiment will be described. In general, the content of an image described in the page descriptive language is set for the resolution corresponding to an exclusive page printer. For example, assume that the printer unit 33 of the image forming apparatus according to this embodiment outputs pixels at 400 dots per inch (dpi), and data according to the page descriptive language corresponding to a page printer for outputting pixels at 240 dpi is supplied to the binary image generation and storage unit 34. In this case, the CPU 50 develops image data on the image memory 52 at a resolution of 240 dpi. When the developed data is transferred to the printer unit 33 of the copying machine, data is set in the enlargement and reduction circuit 57 to enlarge data at a magnification given by:

$$(400/240) \times 100 = 166.6\%$$

The image data is converted into multi-value data by the binary and multi-value conversion unit. Thereafter, the enlargement and reduction circuit executes interpolation of pixels at the set magnification, and the interpolated data is transferred to the printer unit 33. The printer unit 33 outputs the transferred image data at 400 dpi. In this manner, image data input at 240 dpi can be output at 400 dpi.

As described above, according to the first embodiment, binary image data is converted into multi-value image data, and the resolution of the multi-value image data is converted using the enlargement and reduction function. Thus, the resolution of image data can be easily converted to a desired value while suppressing deterioration of image quality. Therefore, image data having various resolutions can be recorded. In the first embodiment, the printer unit of the digital copying machine can be utilized by resolution conversion, and an image forming apparatus having both the functions of a copying machine and a page printer can be realized. Thus, the image forming apparatus with high use efficiency can be provided.

<Second Embodiment>

In the second embodiment, a case will be explained below wherein the above-mentioned page descriptive language processes data which does not depend on the resolution, e.g., vector data. The arrangement of the apparatus is the same as that in the first embodiment. Since data does not depend on the resolution, when input page descriptive language data is vector data, the binary image generation and storage unit 34 need only develop the page descriptive language data according to a constant depending on the designated resolution, so that it can cope with any resolution.

When the CPU 50 develops data onto the image memory 52 like in this embodiment, the time required for developing data is increased as the resolution becomes higher. However, since the binary multi-value conversion unit 56 and the enlargement and reduction circuit 57 can perform real-time processing, the data need only be developed at a low resolution so as not to influence image quality, and the time until actual image data is output from the copying machine can be greatly shortened. Upon comparison of the development times of image data on the basis of the number of pixels per unit area, the development time at 400 dpi is about three times that at 240 dpi as follows:

$$(400)^2/(240)_2 = 25/9$$

Figure 8:
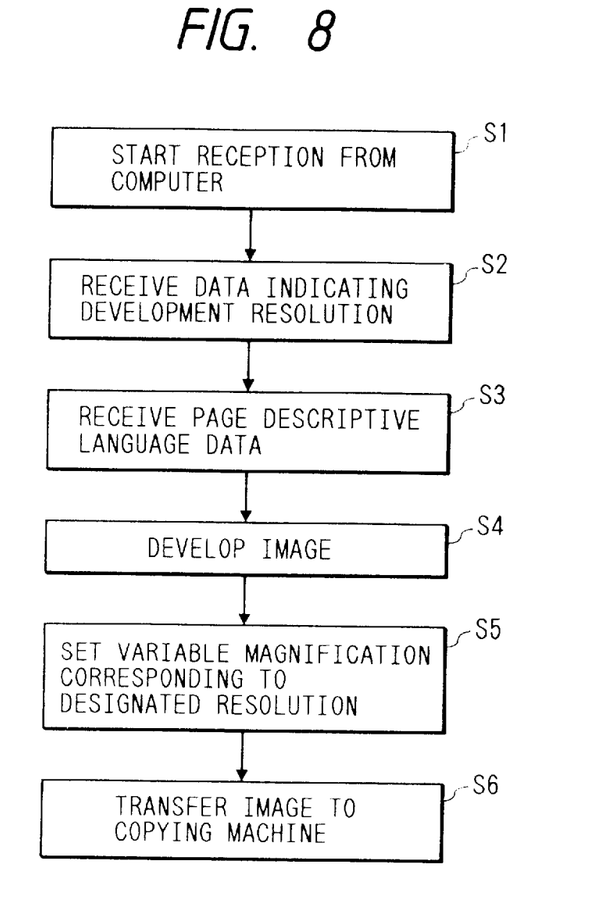
FIG. 8 is a flow chart executed when data which does not depend on the resolution is to be processed.

The effect of this embodiment is remarkable. FIG. 8 is a flow chart when image data input from the external computer connected to the interface 53 is developed at a low resolution.

In step S1, reception from the external computer is started. In step S2, data indicating a development resolution is received. The development resolution is set to be lower than a resolution output to the image signal control circuit. In step S3, page descriptive language data is received, and in step S4, binary image data is developed onto the image memory 52 based on the received data (image data is developed at a resolution lower than that of the printer unit 33).

In step S5, a variable magnification corresponding to a designated resolution is set in the enlargement and reduction circuit 57. For example, when image data is developed at a resolution of 240 dpi, and the developed data is output at a resolution of 400 dpi, a variable magnification to be set is:

$$(400/240) \times 100 = 166.6\%$$

In step S6, the image signal is supplied to the image signal control circuit 32 through the enlargement and reduction circuit 57 set at the above variable magnification.

In this manner, binary image data developed at 240 dpi is converted to multi-value image data at 400 dpi, and the printer unit 33 prints the multi-value image data.

As described above, according to the second embodiment, since image data is developed at a resolution lower than that of the printer unit 33, the processing time of image data can be shortened. In addition, since resolution conversion is performed using multi-value image data, deterioration of an output image can be minimized.

<Third Embodiment>

In the third embodiment, a known facsimile function is applied to means for generating binary image data.

Figure 9:
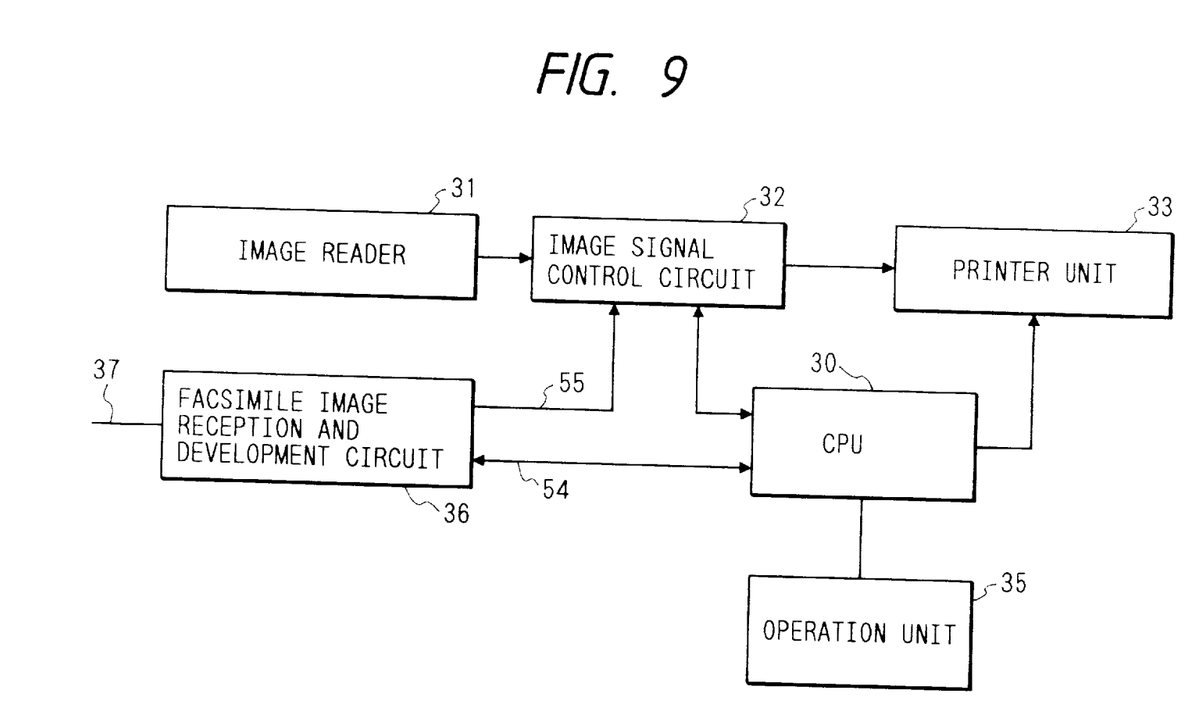
FIG. 9 is a block diagram of an image forming apparatus according to the third embodiment of the present invention.

In a normal facsimile function, as shown in FIG. 9, data received through a public line 37 is developed onto a memory (not shown) included in a facsimile image reception and development circuit 36 by the facsimile image reception and development circuit 36. When the resolution of the developed image data is converted by the method described in the first embodiment, and the resolution-converted data is output, image size information and resolution information are required. In this case, by utilizing the facsimile communication function, the size of a received image, and the resolution of an image can be detected. Therefore, a proper enlargement or reduction ratio is obtained from these values, and the received image can be output as an image expressed by multi-value data.

Note that the present invention may be applied to either a system constituted by a plurality of devices, or an apparatus constituted by a single device.

As described above, according to the present invention, an image forming apparatus, which can generate and output image data having a desired resolution on the basis of input image data, and can execute resolution conversion in a simple arrangement while suppressing deterioration of image quality, can be provided. Image data whose resolution can be changed is developed at a desired resolution, and thereafter, the resolution of the developed image data can be converted into a resolution matching with an output apparatus. Thus, image data can be developed at a resolution lower than that of the output apparatus, thereby shortening the development time of an image.

<Fourth Embodiment>

The operation of the above-mentioned arrangement according to the characteristic feature of the present invention will be described with reference to the block diagram of FIG. 10 and the flow chart of FIG. 11. A copying machine 100 of this embodiment can output an image of a maximum of an A3-size sheet. For this reason, at 240 dpi, an image memory 52 must have a capacity of at least:

(297 mm × 240 dpi/25.4 mm/inch) ×

(420 mm × 240 dpi/25.4 mm/inch)/8 = 1.4 Mbytes

In this embodiment, page descriptive language data is received from a computer (steps T1 and T2), and the size of an image to be generated is determined (step T3). When an A4-size image is formed and output, the required capacity can be half the above-mentioned capacity, i.e., 0.7 Mbytes, and the image memory 52 is used upon being divided into two areas (image memories) 52a and 52b (step T4). Upon completion of development of an image into the divided image memory (52a or 52b), the developed image is output under an assumption that the output order of the developed image is left unchanged. When the developed image is being output from one area (e.g., the area 52a), the flow advances from step T5 to step T7, and the system as a whole is set in a wait state. By utilizing this wait time, development of an image of the next page onto the area 52b is started (step T8). When the output operation of the image from the area 52a is completed, image data of the next page is developed onto the area 52a during the output wait time after the completion of image development onto the area 52b (step T9). When a B4- or A3-size image is developed, one image occupies the entire image memory 52. In order to execute the above-mentioned processing, a memory main controller 51 shown in FIG. 10 is preferably constituted by two equivalent controllers for the sake of easy control. With this arrangement, when the image memory 52 is used upon being divided into two areas, the two memory main controllers can be respectively assigned to the divided memory areas 52a and 52b.

More specifically, the memory main controller 51 generates, e.g., an address signal used when image data is output from the image memory 52. When two controllers are arranged in correspondence with the predetermined memory areas, the memory main controller can be easily constituted by, e.g., gate arrays. When a CPU 50 supplies an instruction to the memory main controller corresponding to, e.g., the area 52a, a bus connected to the area 52a is disconnected from the CPU 50, and thereafter, the memory main controller corresponding to the area 52a and the CPU 50 can parallelly execute different operations.

As described above, according to this embodiment, even during the output operation of an image signal of the previous page (during the operation of one memory main controller), image development by the CPU 50 can be started (steps T6 and T8), and the output operation of an image (the operation of the other memory main controller) can be performed (step T12) while executing, e.g., variable magnification processing (step T11) after the completion of the output operation of the previous page (step T10).

If it is determined in step T3 that an image size is larger than the A4 size, the entire image memory 52 is occupied by one image, and image development is started (step T13). After the completion of the image development (step T14), the flow advances to step T11.

As a modification of this embodiment, a plurality of CPUs for controlling the memory main controller and the image memory may be arranged.

Figure 10:
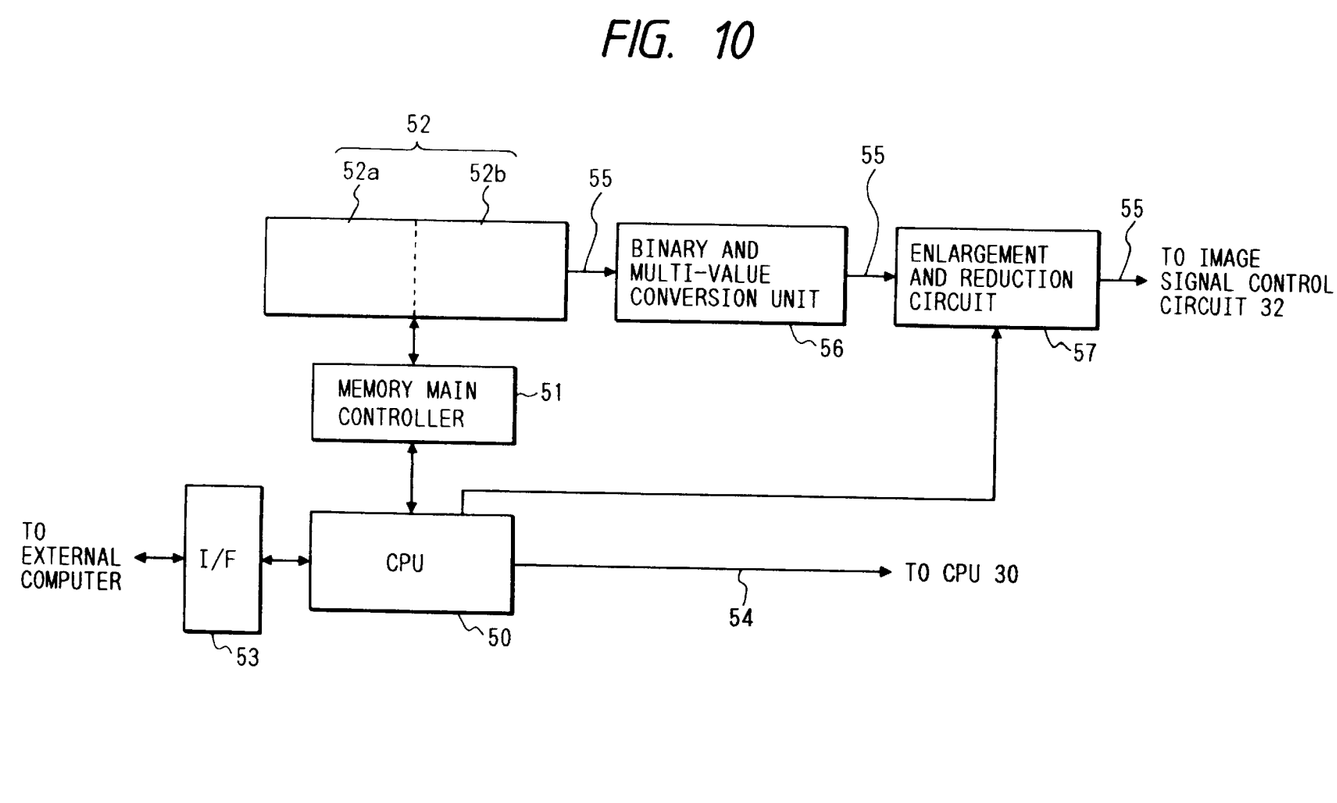
FIG. 10 is a block diagram of a two-value image generation and storage unit.
Figure 11:
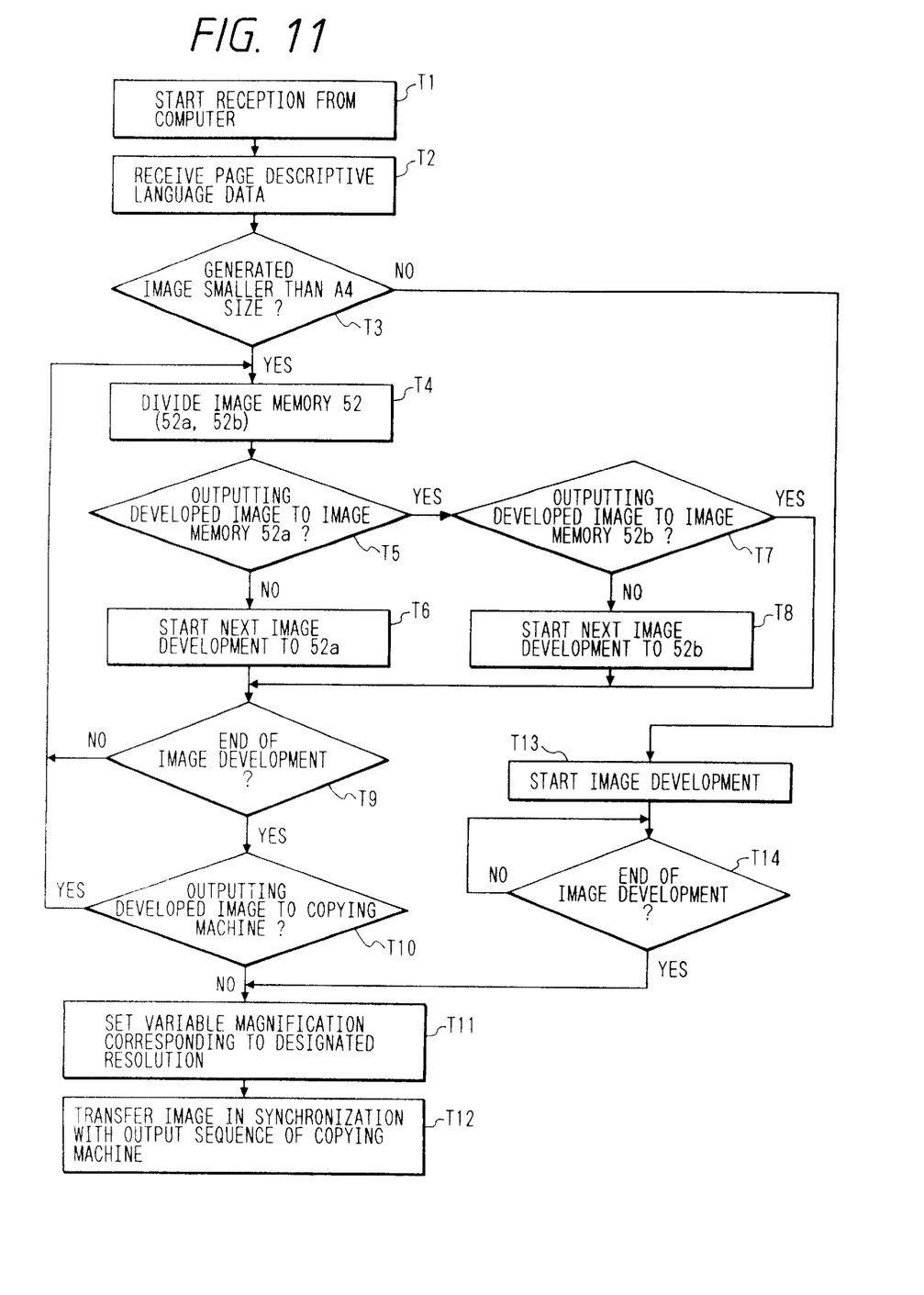
FIG. 11 is a flow chart when an image memory is used upon being divided.

In an arrangement of this modification, two CPUs 50 shown in FIG. 10 are arranged. The flow chart is equivalent to that shown in FIG. 11. In this case, since development operations onto the divided image memories can be parallelly executed, the development and output operations can be executed at higher speed than the above embodiment.

When an image is developed using the entire image memory, one CPU is inhibited from executing development, thus executing proper development.

As described above, when the image forming apparatus capable of generating and outputting a large-size image generates and outputs an image smaller than a predetermined size, the image memory is divided into a plurality of areas, and the image is developed onto one area while the other area is in an output wait state, thereby improving the throughput of the entire apparatus.

<Fifth Embodiment>

Figure 12:
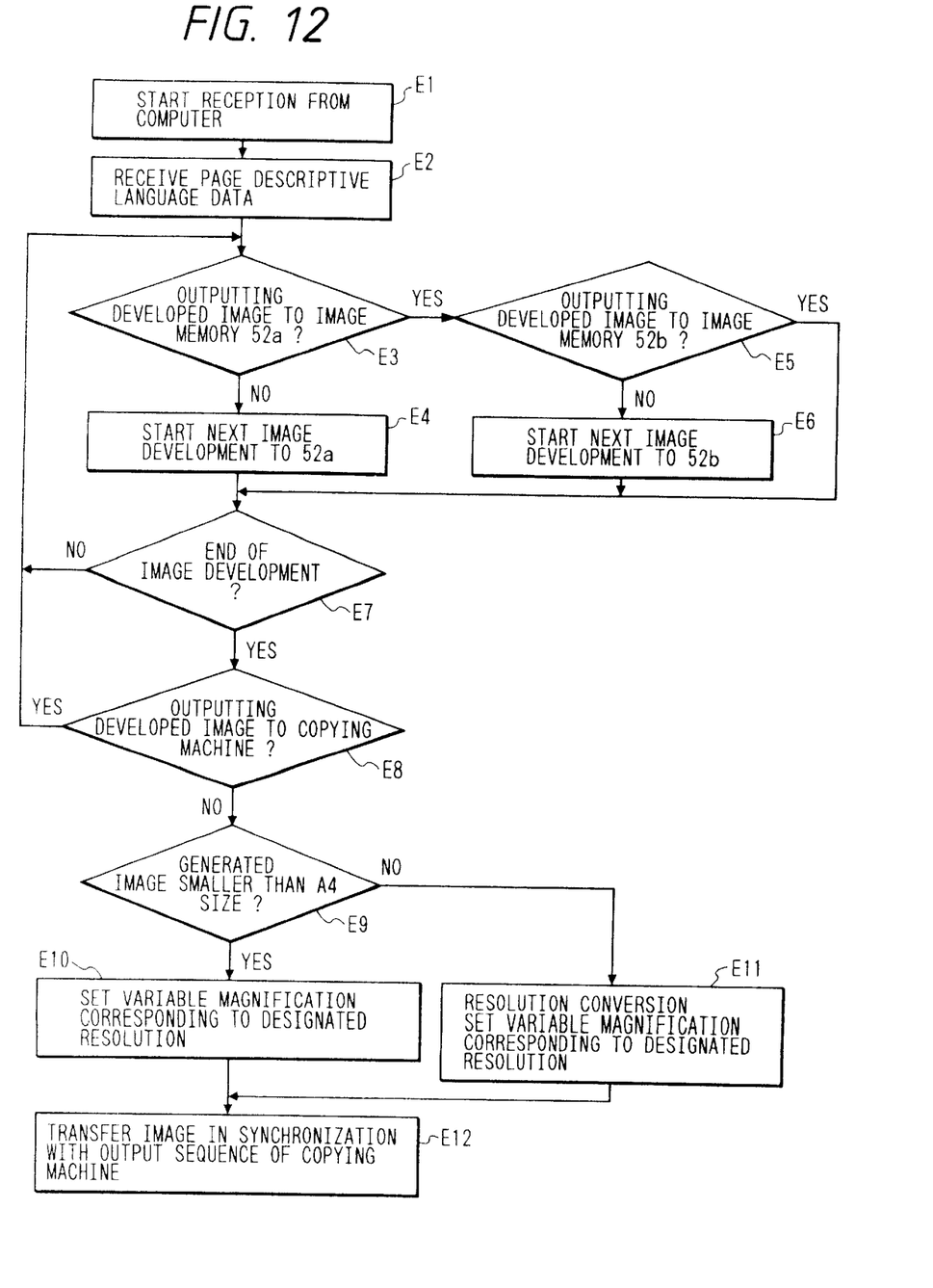
FIG. 12 is a flow chart showing an operation according to the fifth embodiment of the present invention.

In this embodiment, even when the size of an image to be output is an A3 size, the image memory 52 is used upon being divided into the two areas 52a and 52b. More specifically, page descriptive language data is received from a computer (steps E1 and E2), and image development is performed using a non-used one of the areas 52a and 52b (steps E3 to E6). When the image development is completed (step E7), and image data is not being currently output to the copying machine (step E8), resolution conversion and variable magnification processing are performed (steps E10 and E11) according to the image size to be generated (step E9), and the processed image data is output to the copying machine (step E12).

More specifically, in this embodiment, for example, when an A3-size image is developed, since a low resolution is set, image development can be performed using one of the areas 52a and 52b. When image data is output to the copying machine, since resolution conversion is performed in step E11, image data having a desired size and resolution can be output. In this manner, since the image memory 52 is divided into the two areas like in the above embodiment, the throughput can be improved.

What is claimed is:

1. A method for converting binary-level image data in a first resolution representation into multi-value image data in a second resolution representation, comprising:

an obtaining step of obtaining the binary-level image data; and a determining step of determining, based on the binary-level image data, a gradation for each pixel of the multi-value image data, wherein the resulting multi-value image data includes at least three gradations.

2. A method according to claim 1, wherein, in said determining step, when a plurality of pixels in the first resolution representation are located relative to a position of an objective pixel in the second resolution representation for which a gradation is to be determined, the gradation is determined based on the levels of the plurality of pixels and relative positional relations between the plurality of pixels and the objective pixel.

3. A method according to claim 1, wherein the binary-level image data is obtained by converting input information from an external apparatus.

4. A method according to claim 3, wherein the input information comprises at least one of information described in a page description language and facsimile reception information.

5. A method according to claim 3, wherein the input information is independent in resolution.

6. A method according to claim 3, wherein the input information includes information for specifying the first resolution.

7. A method according to claim 6, wherein the information for specifying the first resolution is a command.

8. A method according to claim 1, wherein the first resolution has been previously determined.

9. A method according to claim 1, further comprising a recording step of recording the multi-value image data by using a recording means which records an image in the second resolution.

10. A method according to claim 9, wherein, in said recording step, the image is recorded by using an electrophotographic system.

11. An apparatus for converting binary-level image data in a first resolution representation into multi-value image data in a second resolution representation, comprising:

obtaining means for obtaining the binary-level image data; and determining means for determining, based on the binary-level image data, a gradation for each pixel of the multi-value image data, wherein the resulting multi-value image data includes at least three gradations.

12. An apparatus according to claim 11, wherein, when a plurality of pixels in the first resolution representation are located relative to a position of an objective pixel in the second resolution representation for which a gradation is to be determined, said determining means determines the gradation based on the levels of the plurality of pixels and relative positional relations between the plurality of pixels and the objective pixel.

13. An apparatus according to claim 11, wherein the binary-level image data is obtained by converting input information from an external apparatus.

14. An apparatus according to claim 13, wherein the input information comprises at least one of information described in a page description language and facsimile reception information.

15. An apparatus according to claim 13, wherein the input information is independent in resolution.

16. An apparatus according to claim 13, wherein the input information includes information for specifying the first resolution.

17. An apparatus according to claim 16, wherein the information for specifying the first resolution is a command.

18. An apparatus according to claim 11, wherein the first resolution has been previously determined.

19. An apparatus according to claim 11, further comprising recording means for recording the multi-value image data in the second resolution.

20. An apparatus according to claim 19, wherein said recording means records the image by using an electrophotographic system.

21. An image processing method comprising:

a first step of converting binary image data having a first resolution into multi-value image data having the first resolution, wherein one logical level of the binary image data is converted into a first predetermined value of the multi-value image data, and the other logical level of the binary image data is converted into a second predetermined value of the multi-value image data different from the first predetermined value; and a second step of converting the multi-value image data having the first resolution into multi-value image data having a second resolution, pixel values of the multi-value image data being determined by pixel interpolation based on a ratio of the first and second resolutions.

22. A method according to claim 21, further comprising the step of generating the binary image data having the first resolution on the basis of input information sent from an external apparatus.

23. A method according to claim 22, wherein the input information includes information for specifying the first resolution.

24. A method according to claim 23, wherein the first resolution is specified by a command from the external apparatus.

25. A method according to claim 22, wherein the input information is resolution independent information.

26. A method according to claim 25, wherein the binary image data is generated at the first resolution which is a lower resolution than the second resolution.

27. A method according to claim 25, wherein the first resolution is predetermined.

28. A method according to claim 22, wherein the input information is facsimile reception information.

29. A method according to claim 22, wherein the input information is described in a page description language.

30. A method according to claim 22, wherein a memory means having a plurality of memory areas is provided for storing the generated binary image data, said method including the parallelly executed steps of developing the binary image data in one of the memory areas, and outputting binary image data stored in another one of the memory areas, wherein the binary image data output from the memory means is converted into multi-value image data in said conversion step.

31. A method according to claim 21, further comprising the step of outputting the multi-value image data having the second resolution.

32. An image processing apparatus comprising:

conversion means for converting binary image data having a first resolution into multi-value image data having the first resolution, wherein said conversion means converts one logical level of the binary image data into a first predetermined value of the multi-value image data, and the other logical level of the binary image data into a second predetermined value of the multi-value image data different from the first predetermined value; and resolution conversion means for converting the multi-value image data having the first resolution into multi-value image data having a second resolution, pixel values of the multi-value image data being determined by pixel interpolation based on a ratio of the first and second resolutions.

33. An apparatus according to claim 32, further comprising generation means for generating the binary image data having the first resolution on the basis of input information sent from an external apparatus.

34. An apparatus according to claim 33, wherein said generation means generates the binary image data using the input information which includes information for specifying the first resolution.

35. An apparatus according to claim 34, wherein said generation means generates the binary image data at the first resolution in response to a command from the external apparatus which specifies the first resolution.

36. An apparatus according to claim 33, wherein said generation means generates the binary image data on the basis of the input information which is resolution independent information.

37. An apparatus according to claim 36, wherein said generation means generates the binary image data at the first resolution which is lower than the second resolution.

38. An apparatus according to claim 36, wherein said generation means generates the binary image data at the first resolution which is predetermined.

39. An apparatus according to claim 33, wherein said generation means generates the binary image data on the basis of facsimile reception information.

40. An apparatus according to claim 33, wherein said generation means generates the binary image data on the basis of information described in a page description language.

41. An apparatus according to claim 32, further comprising output means for outputting the multi-value image data having the second resolution.

42. An apparatus according to claim 41, wherein said output means comprises electrophotographic means.

* * * * *

UNITED STATES PATENT AND TRADEMARK OFFICE
CERTIFICATE OF CORRECTION

PATENT NO. : 5,872,636

DATED : February 16, 1999

INVENTOR(S) : HIDETO KOHTANI ET AL.

It is certified that error appears in the above-identified patent and that said Letters Patent is hereby corrected as shown below:

ON THE COVER PAGE:

Under Column [73], after Assignee, insert:

--[*] Notice: This patent issued on a continued prosecution application filed under 37 CFR 1.53(d), and is subject to the twenty year patent term provisions of 35 U.S.C. 154(a)(2).--

Signed and Sealed this

Thirteenth Day of February, 2001

Attest:

NICHOLAS P. GODICI

*Attesting Officer*   *Acting Director of the United States Patent and Trademark Office*